(12) United States Patent
Abdelgany et al.

(10) Patent No.: US 6,614,837 B1
(45) Date of Patent: Sep. 2, 2003

(54) DEVICE SYSTEM AND METHOD FOR LOW NOISE RADIO FREQUENCY TRANSMISSION

(75) Inventors: MohyEldeen Fouad Abdelgany, Irvine, CA (US); William John Domino, Yorba Linda, CA (US); Dmitriy Rozenblit, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/160,690

(22) Filed: Sep. 25, 1998

(51) Int. Cl.$^7$ ................................................ H03K 11/00
(52) U.S. Cl. ........................ 375/211; 375/214; 375/295
(58) Field of Search ................................ 375/219, 295, 375/316, 211, 214, 215; 455/76, 85, 86, 20

(56) References Cited

U.S. PATENT DOCUMENTS

| | | | | |
|---|---|---|---|---|
| 5,319,799 A | * | 6/1994 | Morita ........................ | 455/78 |
| 5,444,415 A | | 8/1995 | Dent et al. .................. | 329/302 |
| 5,557,641 A | | 9/1996 | Weinberg | |
| 5,559,809 A | * | 9/1996 | Jeon et al. ................... | 455/116 |
| 5,740,521 A | * | 4/1998 | Hulko et al. ................. | 455/76 |
| 5,999,824 A | * | 12/1999 | Na .............................. | 455/553 |
| 6,370,360 B1 | * | 4/2002 | Kunkel ........................ | 455/76 |

FOREIGN PATENT DOCUMENTS

| | | |
|---|---|---|
| EP | 0800267 | 10/1997 |
| GB | 2235855 | 3/1991 |

OTHER PUBLICATIONS

Tetsu Sakata, Kazuhiko Seki, Shuji Kubota and Shuzo Kato, *π/4–shift QPSK Digital Modulator LSIC for Personal Communication Terminals*, NTT Radio Communication Systems Laboratories, PIMRC '94, ©IEEE, pp. 472–475.

PCT International Search Report dated Jan. 12, 2000 in PCT Application No. PCT/US99/22143 citing the above identified three references; one each in the U.S., Europe and the U.K.

* cited by examiner

*Primary Examiner*—Don N. Vo
(74) *Attorney, Agent, or Firm*—Weide & Miller, Ltd (57) ABSTRACT

A low noise transmitting device is disclosed. The transmitting device receives a modulated signal having a modulation bandwidth and an intermediate center frequency and generates a modulated transmit band signal at a carrier frequency. The transmitting device includes a first filter that receives the modulated signal and passes frequencies within the modulation bandwidth, producing a low noise filtered modulated signal, and a low noise frequency source that generates a low noise main synthesizer frequency. The filtered modulated signal and the main synthesizer frequency are then fed into a mixer that mixes the two signals (produces either the sum or difference). The output is a low noise modulated transmit band signal that may be amplified to transmit power levels without the need for power-inefficient post-amplification filtering.

36 Claims, 4 Drawing Sheets

DEVICE SYSTEM AND METHOD FOR LOW NOISE RADIO FREQUENCY TRANSMISSION

BACKGROUND OF THE INVENTION

1. Field of the Invention

The present invention relates, generally, to communication systems, devices, and processes which use radio frequency (RF) transmitters, and, in particular embodiments, to such systems, devices, and processes which minimize RF transmitter size and power requirements by producing a low noise modulated signal that eliminates the need for post-amplification transmit band filtering.

2. Description of Related Art

It has become increasingly important to minimize the size, weight and power consumption of various electronic devices, especially personal communication devices such as cellular telephones, personal pagers, cordless telephones, and the like. One way to minimize such characteristics is to minimize the number of components and functions required in the electronic device. However, personal communication devices such as cellular telephones often require complex circuitry with a number of power-inefficient components for performing particular functions.

Figure 1:
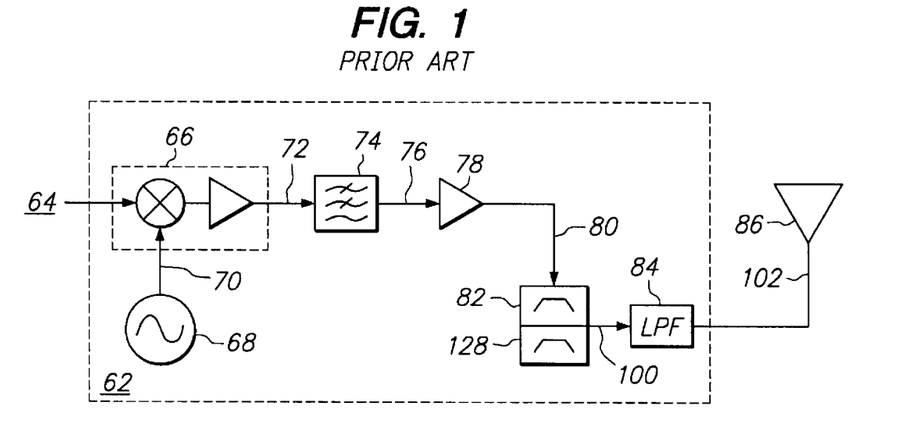
FIG. 1 is a block diagram representation of a conventional RF transmitter.

Upconversion and RF transmission are two such functions that typically require complex and power-inefficient circuitry. Upconversion and RF transmission are the processes of transforming a modulated information signal into an RF signal, filtering it, and amplifying it for transmission to receiving devices such as cell sites in a cellular network, and are typically performed in an RF transmitter. A conventional RF transmitter 62 is illustrated in FIG. 1, where a mixer 66 coupled to a modulator (not shown in FIG. 1) and a main synthesizer 68 receives and mixes a modulated intermediate frequency (IF) signal 64 produced by the modulator with a main synthesizer frequency 70 produced by the main synthesizer 68. The output of the mixer 66 is an unamplified modulated carrier 72. A transmit band small-signal filter 74 coupled to the mixer 66 receives and filters the unamplified modulated carrier 72 to produce a filtered unamplified modulated carrier 76. A power amplifier 78 coupled to the transmit band small-signal filter 74 receives and amplifies the filtered unamplified modulated carrier 76. The output of the power amplifier 78 is an amplified modulated carrier 80. A transmit band large-signal filter 82 coupled to the power amplifier 78 and duplexed with a receive band filter 128 receives and filters the amplified modulated carrier 80 to produce a filtered amplified modulated carrier 100. A wide-band harmonic low pass filter (LPF) 84 coupled to the transmit band large-signal filter 82 receives and further filters the filtered amplified modulated carrier 100 to suppress harmonics of the transmit signal generated by the power amplifier 78. The output of the harmonic LPF 84 is a transmit signal 102. An antenna 86 coupled to the harmonic LPF 84 receives and transmits the transmit signal 102 to ireceiverunits (not shown in FIG. 1).

Figure 6:
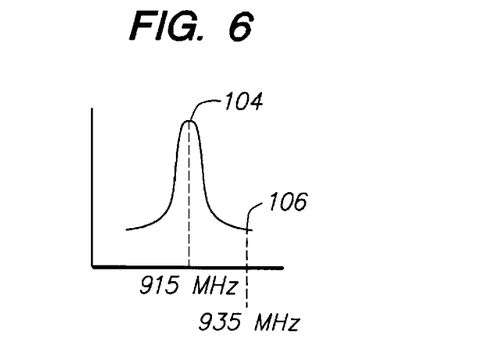
FIG. 6 is a plot in the frequency domain of a representative RF transmission signal.

One requirement of any RF transmitter is to produce a very low noise output to minimize the disruption to nearby receive channels. For example, in the Global System for Mobile (GSM) communication standard, the European standard for digital cellular systems operating in the 900 MHz band, frequency bands are allocated such that a mobile subscriber unit will transmit signals over a transmit band of between 890 and 915 MHz and will receive signals over a receive band of between 935 to 960 MHz. The transmit band is broken up into 125 channels, each channel separated by 200 kHz. If, as illustrated in FIG. 6, a user is transmitting at the very highest channel, 915 MHz, there will be a spike 104 at the 915 MHz carrier frequency, tapering off on either side but with measurable signal even into the 935 MHz region. Signals more than 100 kHz from the 915 MHz carrier frequency represent noise, or unwanted transmitted power. Transmitted noise extending into the designated receive band above 935 MHz is called the receive band noise 106 of the transmitter, which may interfere with the reception of other nearby mobile subscriber units. It is therefore desirable for an RF transmitter to generate very low levels of receive band noise 106 to minimize the disruption to nearby receive channels. However, RF transmitters in conventional GSM cellular telephones produce a significant amount of receive band noise that must be filtered at the output of the power amplifier.

Figure 7:
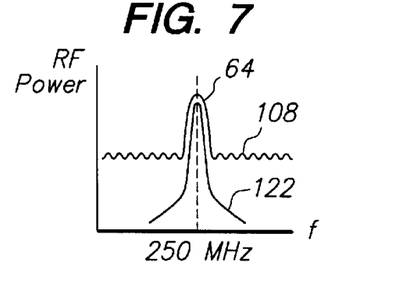
FIG. 7 is a plot in the frequency domain of a modulated IF signal as it enters a mixer, wherein the trace identified by reference character 64 is in accordance with a conventional RF transmitter, and the trace identified by reference character 122 is in accordance with,an embodiment of the present invention.

For purposes of illustration only, the following discussion will focus on an RF transmitter in a conventional GSM cellular telephone receiving a modulated signal with a 200 kHz bandwidth at an IF of 250 MHz and transmitting at the highest channel, 915 MHz, with a receive band noise rejection requirement of −164 dBc/Hz at 935 MHz, and having other intermediate component characteristics specified below. Referring again to FIG. 1, in a conventional GSM RF transmitter 62, a modulated IF signal 64 at 250 MHz having a flat but high noise floor of −135 dBc/Hz (reference character 108) as illustrated in FIG. 7 is applied to the mixer 66 along with the main synthesizer frequency 70 (having a noise floor of −150 dBc/Hz), which is variable to facilitate tuning to different channels. Generally, the main synthesizer 68 is designed to produce a main synthesizer frequency 70 equivalent to the carrier frequency plus the IF. In the example under discussion, the channel frequency is 915 MHz and the IF is 250 MHz, so the main synthesizer 68 will produce a main synthesizer frequency 70 of 1165 MHz.

Figure 8:
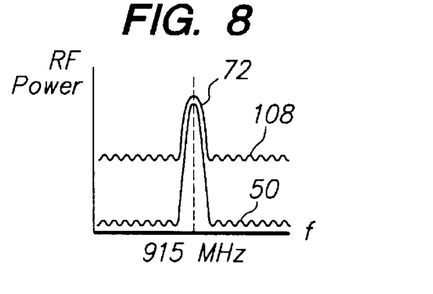
FIG. 8 is a plot in the frequency domain of a mixer output, wherein the trace identified by reference character 72 is in accordance with a conventional RF transmitter, and the trace identified by reference character 50 is in accordance with an embodiment of the present invention.
Figure 9:
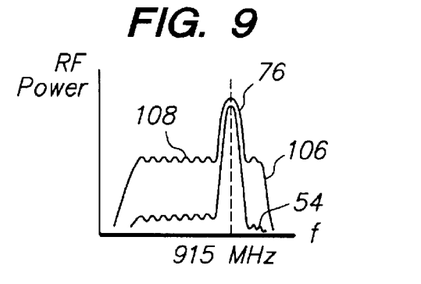
FIG. 9 is a plot in the frequency domain of the input to a power amplifier, wherein the trace identified by reference character 76 is in accordance with a conventional RF transmitter, and the trace identified by reference character 54 is in accordance with an embodiment of the present invention.
Figure 10:
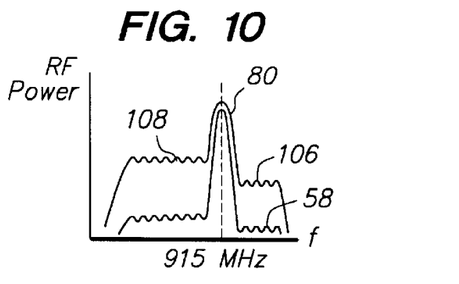
FIG. 10 is a plot in the frequency domain of the output to a power amplifier, wherein the trace identified by reference character 80 is in accordance with a conventional RF transmitter, and the trace identified by reference character 58 is in accordance with an embodiment of the present invention.
Figure 11:
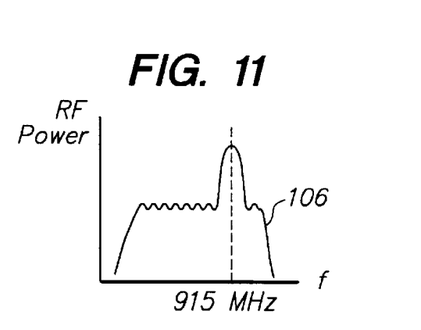
FIG. 11 is a plot in the frequency domain of a representative RF transmitter output.

The output of the mixer 66 is the unamplified modulated carrier 72, which retains the noise floor (reference character 108) of the modulated IF signal 64 as illustrated in FIG. 8. The unamplified modulated carrier 72 enters the transmit band small-signal filter 74 (having a bandwidth of 890 MHz to 915 MHz and attenuation of 20 dB at 935 MHz in this example), where the higher frequency receive band noise 106 is significantly reduced, resulting in the filtered unamplified modulated carrier 76 illustrated in FIG. 9. However, when the filtered unamplified modulated carrier 76 passes through the power amplifier 78 (having output power of +35.5 dBm and a third-order intermodulation product IM3 of −9 dBc in this example), a significant amount of the receive band noise 106 returns in the amplified modulated carrier 80 due to the nonlinearity of the power amplifier 78, as illustrated in FIG. 10. Generally, if unwanted signals are present on one side of the carrier (such as the noise floor 108 in FIG. 9), the nonlinear power amplifier 78 will create a mirror image of those unwanted signals on the other side, albeit at a lower level as determined by the third-order intermodulation product. Thus, in conventional approaches, no amount of filtering by the transmit band small-signal filter 74 on the input side of the power amplifier 78 will eliminate the need for a transmit band large-signal filter 82 on the output side.

As a result, filtering of receive band noise 106 is performed at the end of the transmit chain, after the power amplifier 78 but before the antenna 86. In the GSM example under discussion, the transmit band large-signal filter 82 comprises a bandpass filter with a pass band of about 890 to 915 MHz and attenuation of 20 dB at 935 MHz to pass the entire transmit band, reject the entire receive band, and push down the receive band noise 106 as illustrated in FIG. 1. However, the transmit band large-signal filter 82 has significant insertion loss, typically 2.0 dB, that may eliminate as much as half of the transmitted power. Because GSM cellular telephones can produce a selectable amount of output power, but no more than two watts, the RF transmitter 62 may therefore need to generate as much as four watts of transmit power in order to produce an actual post-filter output of two watts. In this example, significant battery power is wasted in supplying four watts of power to the power amplifier 78 to produce a two watt transmit signal 102.

Figure 2:
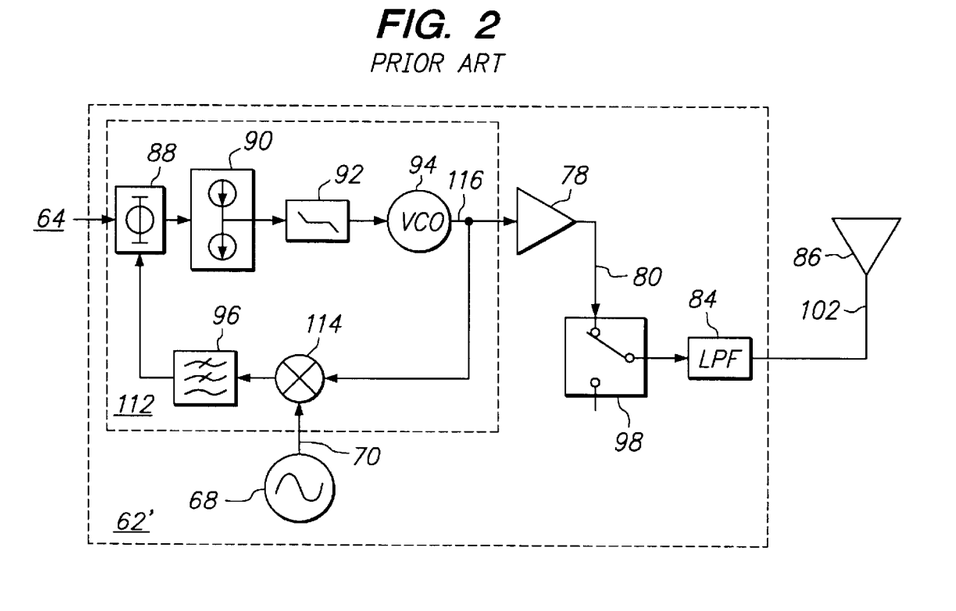
FIG. 2 is a block diagram representation of a conventional RF transmitter utilizing a translation loop.

An alternative to the conventional RF transmitter 62 is a translation loop transmitter 62' illustrated in FIG. 2. In this approach, the mixer 66 and transmit band small-signal filter 74 of FIG. 1 are replaced by a translation loop 112 capable of producing a very low noise signal. The translation loop 112 includes a voltage controlled oscillator (VCO) 94, a mixer 114 for determining the difference between the frequency of the VCO 94 and a main synthesizer frequency 70 from main synthesizer 68, a low-pass filter 96 for filtering the output of the mixer 114, a phase detector 88 for determining the phase difference between the mixer output and the modulated IF signal 64, a charge pump 90 for sourcing or sinking current as determined by the phase difference output of the phase detector 88, and a loop filter 92 for integrating current pulses from the charge pump 90 and providing a control voltage to the VCO 94. Low receive band noise is achieved not by post-power amplifier filtering, but by generating minimal noise prior to amplification, resulting in minimal unwanted signals for the nonlinear power amplifier to amplify and reflect.

Figure 12:
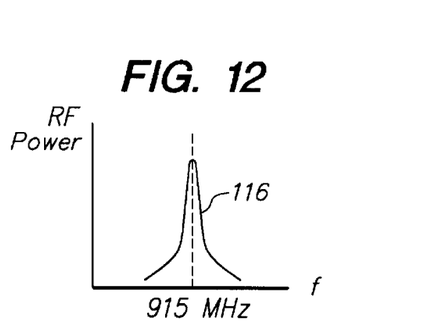
FIG. 12 is a plot in the frequency domain of the translation loop output of a conventional RF transmitter utilizing a translation loop.
Figure 13:
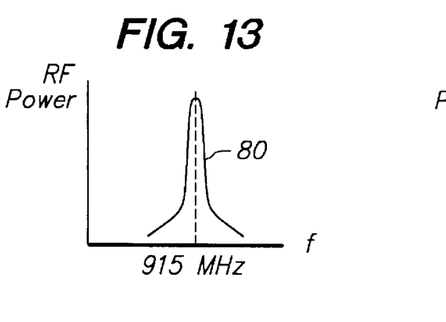
FIG. 13 is a plot in the frequency domain of the power amplifier output of a conventional RF transmitter utilizing a translation loop.

In the translation loop approach of FIG. 2, the translation loop 112 translates the modulated IF signal 64 to the carrier frequency of 915 MHz. The translation loop 112 is designed to have a bandwidth of about one MHz, so any disturbances outside this bandwidth will be rejected. Thus, the translation loop 112 is essentially a 1 MHz wide filter, tunable to the selected carrier frequency. The key to the translation loop approach is the VCO 94, which must be chosen to meet the desired noise requirements. By utilizing a VCO 94 with a noise floor of−164 dBc/Hz (which meets the desired noise requirements), noise surrounding the carrier frequency is greatly reduced, and there is very little noise to be reflected when the translation loop output 116, illustrated in FIG. 12, is amplified by the power amplifier 78 (with output power of+34.0 dBm in this example). Because of the low noise on the output of power amplifier 78 (amplified modulated carrier 80) illustrated in FIG. 13, no power-inefficient transmit band large-signal filter is needed, and thus only a low loss T/R switch 98 is needed for connecting the antenna to either the transmit or receive electronics, but not both. However, some of the power savings is lost because the low noise VCO 94 is a high power consumption device. In addition, the translation loop approach is larger, more expensive, and more complicated due to the additional components required.

SUMMARY OF THE DISCLOSURE

Therefore, it is an object of embodiments of the present invention to provide a device, system and method for low noise RF transmission of signals that is also lower in power consumption relative to conventional systems, devices, and methods.

It is a further object of embodiments of the invention to provide a system, device, and method for low noise RF transmission of signals that is also lower in cost, size, and complexity relative to conventional systems and methods due to its avoidance of translation loop circuitry.

These and other objects are accomplished according to a transmitting device that receives a modulated signal having a modulation bandwidth and an intermediate center frequency and generates a modulated transmit band signal at a carrier frequency. The transmitting device includes a first filter that receives the modulated signal and passes frequencies within the modulation bandwidth, producing a low noise filtered modulated signal, and a low noise frequency source that generates a low noise main synthesizer frequency. The filtered modulated signal and the main synthesizer frequency are then fed into a mixer that mixes the two signals (produces either the sum or difference). The output is a low noise modulated transmit band signal that may be amplified to transmit power levels without the need for power-inefficient post-amplification filtering.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention relate, generally, to communication systems and processes which use RF transmitters, and RF transmitter devices and processes.

RF transmitters and upconversion processes according to embodiments of the present invention may be employed in a variety of communications electronics, including wireless transmission systems as well as wired systems. Thus, embodiments of the invention described herein may involve various forms of communications systems. However, for purposes of simplifying the present disclosure, preferred embodiments of the present invention are described herein, in relation to personal wireless communications systems, including, but not limited to digital mobile telephones, digital cordless telephones, digital pagers, combinations thereof, and the like. Such personal communications systems typically include one or more portable or remotely located receiver and/or transmitter units. In most applications, it is typically desirable to minimize the power requirements, size, weight and cost, of such receiver/transmitter units, for example, to improve portability and increase usage time between power recharges.

Figure 3:
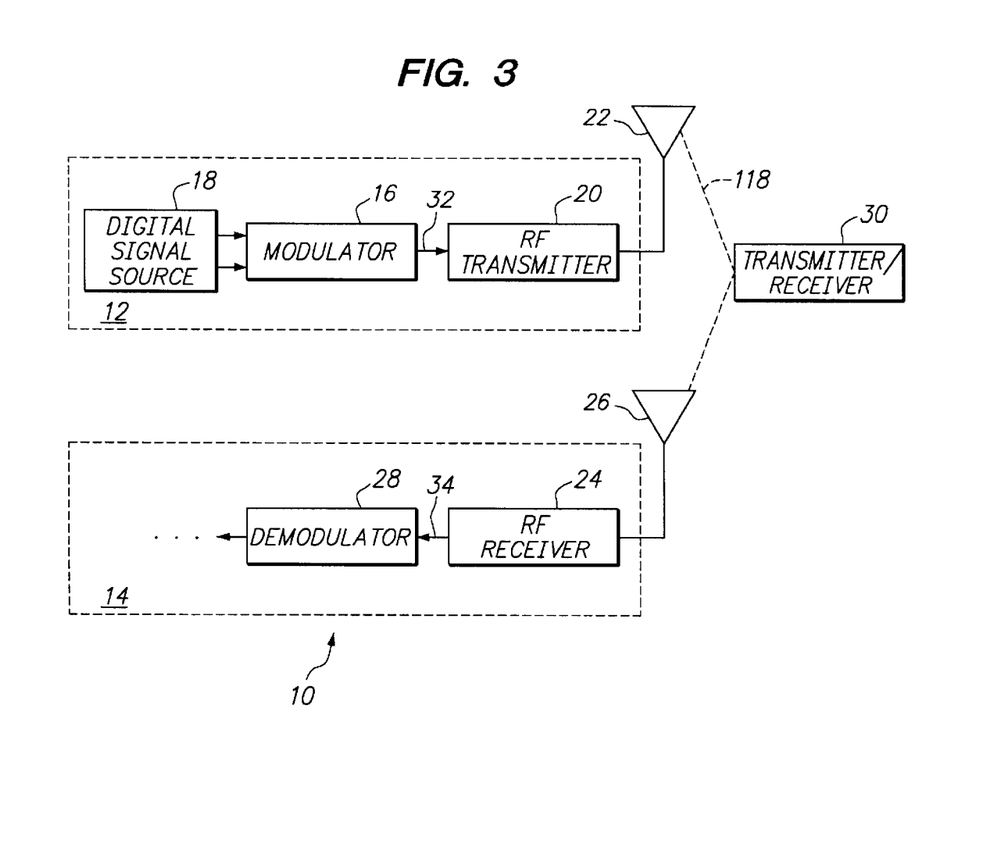
FIG. 3 is block diagram representation of a system environment according to an example embodiment of the present invention.

A generalized representation of a communication system environment of an embodiment of the present invention is shown in FIG. 3, wherein a communication system 10 includes a transmitting unit 12 and a receiving unit 14, coupled for communication over a communication channel 118. The transmitting unit 12 includes a modulator 16 connected to receive a data signal (baseband signal) from a data signal source 18. In one representative embodiment, the data signal source 18 may include, for example, a microphone for converting sound waves into electronic signals and sampling and analog-to-digital converter electronics for sampling and converting the electronic signals into digital signals representative of the soundwaves. In other embodiments, the data signal source 18 may include any suitable device for producing digital data signals for communication over the channel 118, such as, but not limited to, a keyboard, a digital voice encoder, a mouse or other user input device, a sensor, monitor or testing apparatus, or the like.

The modulator 16 provides a modulated signal 32 as an output to a transmitter 20. The signal output of the transmitter 20 is provided for transmission from an antenna 22. The receiving unit 14 includes an RF receiver 24 connected to an antenna 26, to receive a modulated signal. The RF receiver 24 provides a filtered modulated signal 34 to a demodulator 28 for demodulation to produce the data signal (baseband).

The demodulated (baseband) signal output from the demodulator 28 may be provided to signal processing electronics, sound producing electronics or the like, depending upon the nature of use of the communication system. The transmitter and receiver units include further components, power supplies, and the like, well known in the art for effecting transmission and reception of signals and for carrying out other functions specific to the nature and application of use of the system.

In preferred two-way communication system embodiments, such as cellular telephone embodiments or cordless telephone embodiments, each transmitting unit 12 and receiving unit 14 is configured to function as both a transmitting unit and a receiving unit. In one system embodiment, the transmitting unit 12 and receiving unit 14 transmit and receive signals directly therebetween. In other system embodiments, the transmitting unit 12 and receiving unit 14 communicate through one or more additional transmitter/receiver configurations (such as repeater, base or cell stations), generally represented as reference character 30 in FIG. 3.

In digital cellular telephone or cordless telephone system embodiments, the data signal source 18 provides the modulator 16 with a baseband signal, for example, a sampled voice (or sound) signal comprising I and Q channel signals. Such I and Q channel signals are provided to I and Q channel inputs of a modulator 16 as shown, for example, in FIG. 4. The modulator 16 in FIG. 4 includes an encoder 36, a shaping filter 38, and frequency conversion and modulation electronics 40.

Figure 4:
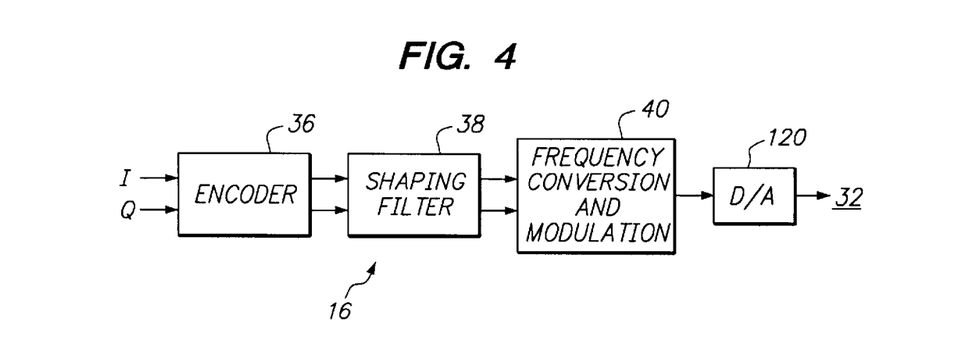
FIG. 4 is a more detailed block diagram representation of the modulator in the system of FIG. 1.

Baseband I and Q channel signals from a data signal source are provided to the I and Q inputs of the encoder 36. The I and Q outputs of the encoder are provided to the shaping filter 38. In one preferred cellular telephone embodiment, the encoder 36 comprises a Phase Shift Key encoder, such as, but not limited to, a $\pi/4$-shift Quadrature Phase Shift Key mapper with differential encoder ($\pi/4$ DQPSK), and the shaping filter 38 comprises a pulse shaping filter for smoothing the encoder output signal. An example of a $\pi/4$ DQPSK and pulse shaping electronics is described in the article entitled: "$\pi/4$-shift QPSK Digital Modulator LSIC for Personal Communication Terminals," by Tetsu Sakata, Kazuhiko Seki, Shuji Kubota and Shuzo Kato, Proc. 5th IEEE International Symposium on Personal, Indoor and Mobile Radio Communications, 1994 (incorporated herein by reference). Other embodiments may employ other suitable encoding schemes, including but not limited to Amplitude Shift Keying and Frequency Shift Keying schemes.

The I and Q outputs of the shaping filter 38 are provided to the frequency conversion and modulation electronics 40, the output of which comprises a modulated IF signal. In systems having analog transmission channels, the modulated IF signal may be converted to an analog signal for transmission. Accordingly, the modulated IF signal output of digital frequency conversion and modulation electronics 40 in FIG. 4 is provided to a digital-to-analog (D/A) converter 120. The D/A converter 120 provides an analog modulated signal 32 to transmitter 20 (FIG. 3), which provides the output IF signal to the antenna 22 (FIG. 3) for transmission.

Figure 5:
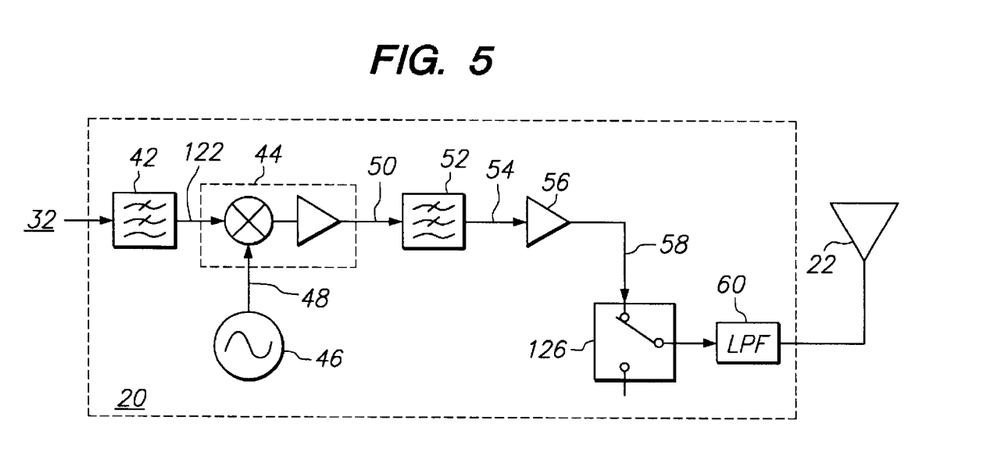
FIG. 5 is a block diagram representation of an RF transmitter according to an embodiment of the present invention.

A transmitter 20 according to an embodiment of the present invention is illustrated in FIG. 5. Embodiments of the present invention eliminate the need for a post-amplification power-inefficient filter by presenting a lower noise filtered modulated transmit band signal 54 to the power amplifier 56. Again, for purposes of illustration only, the following discussion focuses on an RF transmitter in a GSM cellular telephone receiving a modulated signal with a 200 kHz bandwidth at an IF of 250 MHz and transmitting at the highest channel, 915 MHz, with a receive band noise rejection requirement of –164 dBc/Hz at 935 MHz, and having other intermediate component characteristics specified below. However, it should be understood that in alternative embodiments, other communication standards such as EGSM, DCS, and PCS may be employed.

In the embodiment illustrated in FIG. 5, the modulated signal 32 is filtered by a first filter 42 before it enters a mixer 44. Because in preferred embodiments of the present invention the center frequency and modulation bandwidth of the modulated signal 32 is fixed, the first filter 42 can be very narrow, and the first filter output 122 will have significant noise suppression on either side of the 250 MHz center frequency as indicated by reference character 122 in FIG. 7. In preferred embodiments, the first filter 42 should have enough bandwidth to pass the modulated signal 32 without distorting it, yet suppress unwanted frequencies. In the GSM system under discussion, the modulation bandwidth of the modulated signal 32 is 200 kHz, the center frequency of the modulated signal is 250 MHz, and the closest possible unwanted frequency is the 935 MHz receive band, 20 MHz away from transmissions at the 915 MHz transmit band. Thus, in this example the first filter 42 should have a center frequency of 250 MHz and a bandwidth between 200 kHz and 20 MHz. In preferred embodiments generally, the first filter 42 should have a bandwidth of approximately five times the modulation bandwidth of the modulated signal 32. However, in alternative embodiments of the present invention, the first filter 42 may have any bandwidth sufficient to filter out desired noise yet leave the modulated signal 32 substantially undistorted.

Figure 14:
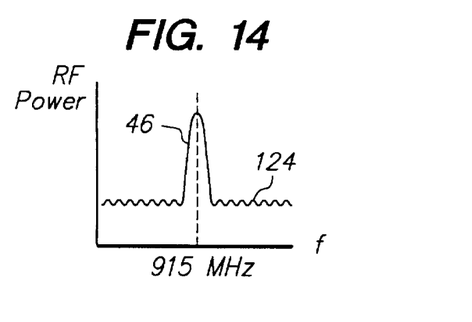
FIG. 14 is a plot in the frequency domain of the VCO output of an RF transmitter according to an embodiment of the present invention.

In addition to the first filter 42, a low noise frequency source 46 similar to the one in the translation loop approach of FIG. 2 is used for generating the main synthesizer frequency 48, rather than the main synthesizer 68 used in the conventional approaches of FIGS. 1 and 2. Unlike the translation loop approach, the frequency source 46 in the preferred embodiment of FIG. 5 does not have to meet desired noise requirements, but it must have better noise performance than the main synthesizer 68. FIG. 14 illustrates a plot in the frequency domain of the output of the frequency source 46. By increasing the power of the frequency source 46, the amplitude of the carrier frequency increases, yet the noise on either side stays the same. Thus, a lower noise (relative to the signal strength) frequency source 46 may be obtained at the expense of added power. In preferred embodiments, the frequency source 46 is a VCO, but in alternative-embodiments the frequency source may be any tunable frequency generating device that meets the above requirements.

Because of the low noise filtered modulated signal 122 and low noise main synthesizer frequency 48, the modulated transmit band signal 50 generated by mixer 44 will have very little noise outside the carrier frequency, as indicated by reference character 50 in FIG. 8. The modulated transmit band signal 50 then passes through a second filter 52 designed to pass the transmit band frequencies (890 MHz to 915 MHz in this example), producing a filtered modulated transmit band signal 54 with most of the remaining receive band noise eliminated, as indicated by reference character 54 in FIG. 9. When the filtered modulated transmit band signal 54 passes through the power amplifier 56, the resultant amplified modulated transmit band signal 58 will again contain foldover receive band noise due to the nonlinearity of the power amplifier 56, as illustrated by reference character 58 in FIG. 10. However, because the receive band noise is so low, a post-amplification transmit band filter is not needed and the amplified modulated transmit band signal 58 is fed straight into a T/R switch 126 for connecting the antenna to either the transmit or receive electronics, but not both. The output of the T/R switch 126 is coupled to harmonic LPF 60, which suppresses harmonics of the modulated transmit band signal 58 generated by the power amplifier 56, and the output of harmonic LPF 60 is coupled to the antenna 22. Elimination of the post-amplification transmit band filter allows the power amplifier 56 to operate at lower power, extending battery life. In addition, the large costly duplexer used in conventional transmitters is eliminated, reducing the overall size of the RF transmitter.

Therefore, according to the foregoing description, preferred embodiments of the present invention provide a system and method for low noise RF transmission of signals that is lower in power consumption relative to conventional systems and methods. In addition, preferred embodiments of the present invention provide a system and method for low noise RF transmission of signals that is also lower in cost, size, and complexity relative to conventional systems and methods due to its avoidance of translation loop circuitry.

The foregoing description of preferred embodiments of the invention has been presented for the purposes of illustration and description. It is not intended to be exhaustiveor to limit the invention to the precise form.disclosed. It is intended that the scope of the invention be limited not by this detailed description, but rather by the claims appended hereto.

What is claim is:

1. A transmitting device for receiving a modulated signal having a modulation bandwidth and an intermediate center frequency and generating a modulated transmit band signal at a carrier frequency, the transmitting device comprising:

a first filter having a first filter input coupled to receive the modulated signal and pass frequencies within the modulation bandwidth, and a first filter output to provide a filtered modulated signal;

a low noise frequency source for generating a main synthesizer frequency, the low noise frequency source having noise characteristics greater than a noise rejection requirement for a receive band of the transmitting device; and a mixer having a first mixer input coupled to the first filter output to receive the filtered modulated signal, a second mixer input coupled to the low noise frequency source to receive the main synthesizer frequency, and a mixer output to provide the modulated transmit band signal, the modulated transmit band signal representing a mixing of the filtered modulated signal with the main synthesizer frequency.

2. A transmitting device as recited in claim 1, wherein the first filter is a bandpass filter centered about the intermediate center frequency and having a first filter bandwidth no less than approximately the modulation bandwidth.

3. A transmitting device as recited in claim 1, wherein the low noise frequency source comprises a voltage controlled oscillator.

4. A transmitting device as recited in claim 1, wherein the low noise frequency source is configured for generating the main synthesizer frequency at a frequency approximately equivalent to the intermediate center frequency added to the carrier frequency, and the mixer is configured to generate the modulated transmit band signal at a frequency approximately equivalent to the filtered modulated signal subtracted from the main synthesizer frequency.

5. A transmitting device as recited in claim 1, wherein the low noise frequency source is configured for generating the main synthesizer frequency at a frequency approximately equivalent to the intermediate center frequency subtracted from the carrier frequency, and the mixer is configured to generate the modulated transmit band signal at a frequency approximately equivalent to the filtered modulated signal added to the main synthesizer frequency.

6. A transmitting device as recited in claim 1, further including a second filter having a second filter input coupled to receive the modulated transmit band signal and filter out undesired frequency bands, and a second filter output to provide a filtered modulated transmit band signal.

7. A transmitting device as recited in claim 6, further including an amplifier having an amplifier input coupled to the second filter output to receive and amplify the filtered modulated transmit band signal, and an amplifier output to provide an amplified modulated transmit band signal.

8. A transmitting device as recited in claim 7, further including an antenna having an antenna input coupled to the amplifier output to receive and transmit the amplified modulated transmit band signal.

9. A transmitting device as recited in claim 6, wherein the low noise frequency source is adjustable to produce the carrier frequency at between approximately 880 MHz and 915 MHz, and the second filter has a lower corner frequency of not more than approximately 880 MHz and an upper corner frequency between approximately 915 MHz and 925 MHz.

10. A transmitting device as recited in claim 6, wherein the low noise frequency source is adjustable to produce the carrier frequency at between approximately 1710 MHz and 1785 MHz, and the second filter has a lower corner frequency of not more than approximately 1710 MHz and an upper corner frequency between approximately 1785 MHz and 1805 MHz.

11. A transmitting device as recited in claim 6, wherein the low noise frequency source is adjustable to produce the carrier frequency at between approximately 1850 MHz and 1910 MHz, and the second filter has a lower corner frequency of not more than approximately 1850 MHz and an upper corner frequency between approximately 1910 MHz and 1930 MHz.

12. The transmitting device as recited in claim 1, wherein the first filter is a bandpass filter having a bandwidth approximately five times the modulation bandwidth of the modulated signal.

13. In a communication system comprising at least one transmitting unit and at least one receiving unit for communication on a communication channel, the transmitting unit comprising:
  a digital signal source for providing first and second digital baseband signals;
  a modulator having a first modulator input coupled to receive the first digital baseband signal and a second modulator input coupled to receive the second digital baseband signal, the modulator having a modulator output to provide a modulated signal having a modulation bandwidth and centered about an intermediate frequency; and
  a transmitting device having an transmitting device input coupled to receive the modulated signal, the transmitting device comprising
    a first filter having a first filter input coupled to receive the modulated signal and pass frequencies within the modulation bandwidth, and a first filter output to provide a filtered modulated signal,
    a low noise frequency source for generating a main synthesizer frequency, the low noise frequency source having noise characteristics greater than a noise rejection requirement for a receive band of the transmitting device; and
    a mixer having a first mixer input coupled to the first filter output to receive the filtered modulated signal, a second mixer input coupled to the low noise frequency source to receive the main synthesizer frequency, and a mixer output to provide the modulated transmit band signal, the modulated transmit band signal representing a mixing of the filtered modulated signal with the main synthesizer frequency.

14. A communication system as recited in claim 13, wherein the first filter is a bandpass filter centered about the intermediate center frequency and having a first filter bandwidth no less than approximately the modulation bandwidth.

15. A communication system as recited in claim 13, wherein the low noise frequency source comprises a voltage controlled oscillator.

16. A communication system as recited in claim 13, wherein the low noise frequency source is configured for generating the main synthesizer frequency at a frequency approximately equivalent to the intermediate center frequency added to the carrier frequency, and the mixer is configured to generate the modulated transmit band signal at a frequency approximately equivalent to the filtered modulated signal subtracted from the main synthesizer frequency.

17. A communication system as recited in claim 13, wherein the low noise frequency source is configured for generating the main synthesizer frequency at a frequency approximately equivalent to the intermediate center frequency subtracted from the carrier frequency, and the mixer is configured to generate the modulated transmit band signal at a frequency approximately equivalent to the filtered modulated signal added to the main synthesizer frequency.

18. A communication system as recited in claim 13, further including a second filter having a second filter input coupled to receive the modulated transmit band signal and filter out undesired frequency bands, and a second filter output to provide a filtered modulated transmit band signal.

19. A communication system as recited in claim 18, further including an amplifier having an amplifier input coupled to the second filter output to receive and amplify the filtered modulated transmit band signal, and an amplifier output to provide an amplified modulated transmit band signal.

20. A communication system as recited in claim 19, further including an antenna having an antenna input coupled to the amplifier output to receive and transmit the amplified modulated transmit band signal.

21. A communication system as recited in claim 18, wherein the low noise frequency source is adjustable to produce the carrier frequency at between approximately 880 MHz and 915 MHz, and the second filter has a lower corner frequency of not more than approximately 880 MHz and an upper corner frequency between approximately 915 MHz and 925 MHz.

22. A communication system as recited in claim 18, wherein the low noise frequency source is adjustable to produce the carrier frequency at between approximately 1710 MHz and 1785 MHz, and the second filter has a lower corner frequency of not more than approximately 1710 MHz and an upper corner frequency between approximately 1785 MHz and 1805 MHz.

23. A communication system as recited in claims 18, wherein the low noise frequency source is adjustable to produce the carrier frequency at between approximately 1850 MHz and 1910 MHz, and the second filter has a lower corner frequency of not more than approximately 1850 MHz and an upper corner frequency between appoximately 1910 MHz and 1930 MHz.

24. The communication system as recited in claim 13, wherein the first filter is a bandpass filter having a bandwidth approximately five times the modulation bandwidth of the modulated signal.

25. A process for a transmitting device for receiving a modulated signal having a modulation bandwidth and an intermediate center frequency and generating a modulated transmit band signal at a carrier frequency, the process comprising:

filtering the modulated signal to pass frequencies within the modulation bandwidth and generate a filtered modulated signal; and mixing the filtered modulated signal with a main synthesizer frequency from a low noise frequency source to generate the modulated transmit band signal, the low noise frequency source having noise characteristics greater than a noise rejection requirement for a receive band of the transmitting device.

26. A process as recited in claim 25, wherein the step of filtering the modulated signal to pass frequencies within the modulation bandwidth and generate a filtered modulated signal further includes the step of:

filtering about the intermediate center frequency with a bandwidth no less than approximately the modulation bandwidth, and no greater than approximately twice an absolute value of a difference between the carrier frequency and a closest undesired frequency.

27. A process as recited in claim 25, wherein the step of mixing the filtered modulated signal with a main synthesizer frequency from a low noise frequency source comprises subtracting the filtered modulated signal from the main synthesizer frequency, the process further including the step of tuning the low noise frequency source to generate the main synthesizer frequency at a frequency approximately equivalent to the intermediate center frequency added to the carrier frequency.

28. A process as recited in claim 25, wherein the step of mixing the filtered modulated signal with a main synthesizer frequency from a low noise frequency source comprises adding the filtered modulated signal to the main synthesizer frequency, the process further including the step of tuning the low noise frequency source to generate the main synthesizer frequency at a frequency approximately equivalent to the intermediate center frequency subtracted from the carrier frequency.

29. A process as recited in claim 25, further including the step of:

filtering the modulated transmit band signal to filter out undesired frequency bands and generate a filtered modulated transmit band signal.

30. A process as recited in claim 29, further including the step of:

amplifying the filtered modulated transmit band signal to generate an amplified modulated transmit band signal.

31. A process as recited in claim 30, further including the step of:

transmitting the amplified modulated transmit band signal through an antenna.

32. A process as recited in claim 29, wherein the step of filtering the modulated transmit band signal to filter out undesired frequency bands further includes:

filtering with a lower corner frequency of not more than approximately 880 MHz and an upper corner frequency between approximately 915 MHz and 925 MHz.

33. A process as recited in claim 29, wherein the step of filtering the modulated transmit band signal to filter out undesired frequency bands further includes:

filtering with a lower corner frequency of not more than approximately 1710 MHz and an upper corner frequency between approximately 1785 MHz and 1805 MHz.

34. A process as recited in claim 29, wherein the step of filtering the modulated transmit band signal to filter out undesired frequency bands further includes:

filtering with a lower corner frequency of not more than approximately 1850 MHz and an upper corner frequency between approximately 1910 MHz and 1930 MHz.

35. The process recited in claim 25, wherein the step of filtering the modulated signal to pass frequencies within the modulated bandwidth and generate a filtered modulated signal further includes:

filtering about the intermediate center frequency with a bandwidth approximately five times the modulation bandwidth of the modulated signal.

36. A transmitting device for receiving a modulated signal having a modulation bandwidth and an intermediate center frequency and generating an amplified modulated transmit band signal, the transmitting device comprising:

means for receiving and filtering the modulated signal to pass frequencies within the modulation bandwidth and generate a filtered modulated signal;

means for mixing the filtered modulated signal with a main synthesizer frequency from a low noise frequency source to produce a modulated transmit band signal, the low noise frequency source having noise characteristics greater than a noise rejection requirement for a receive band of the transmitting device; and means for filtering and amplifying the modulated transmit band signal to generate an amplified modulated transmit band signal.

* * * * *